Sept. 30, 1958  H. F. GERWIG ET AL  2,853,976
FOUR WAY, SOLENOID ACTUATED, FLUID OPERATED VALVE
Filed Nov. 8, 1954  3 Sheets-Sheet 2

INVENTORS
HARVEY F. GERWIG
ROBERT M. COX
FRED O. HOSTERMAN
ROBERT V. HOLLINGSWORTH
By Gulwider Mattingly & Huntley
Attorneys

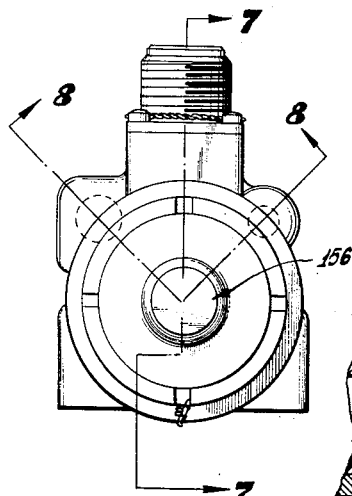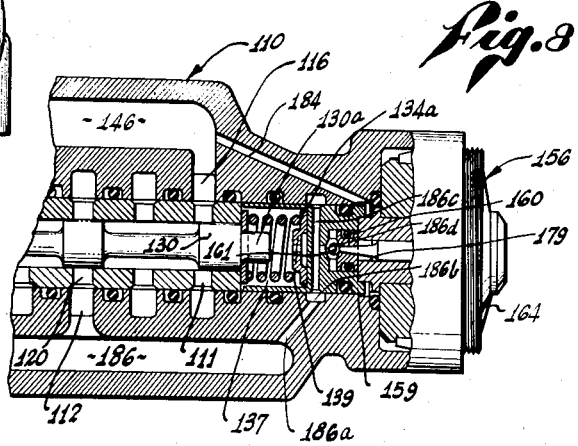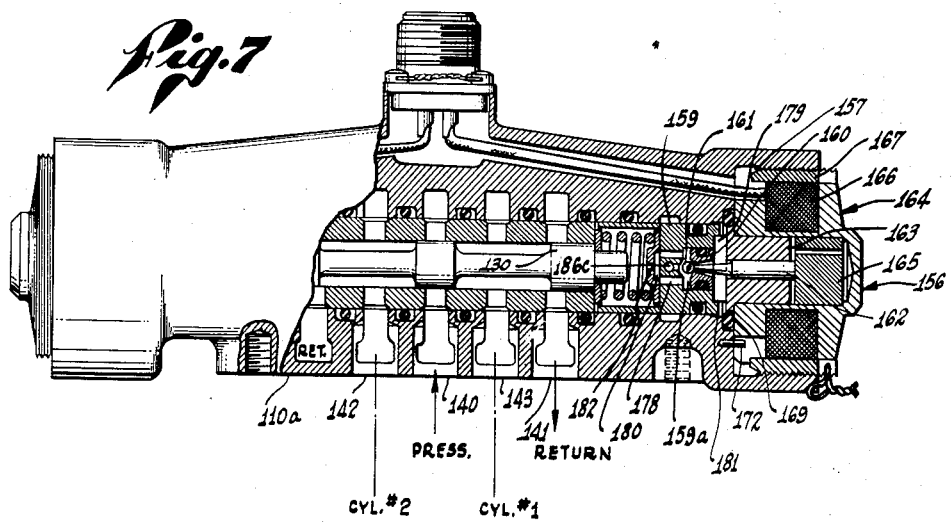

ered to as pilot valve operation. While the invention will be described in connection with a pilot valve for air-craft systems, it will be realized that usefulness of the invention is not limited to such valves, but may be incorporated in many other types of hydraulic systems.

2,853,976

FOUR WAY, SOLENOID ACTUATED, FLUID OPERATED VALVE

Harvey F. Gerwig, Glendale, Robert M. Cox, Northridge, and Fred O. Hosterman and Robert V. Hollingsworth, North Hollywood, Calif., assignors to Weston Hydraulics, Limited, North Hollywood, Calif., a corporation of California Application November 8, 1954, Serial No. 467,514

6 Claims. (Cl. 121—46.5)

The present invention relates generally to fluid valves for hydraulic systems and the like, and more particularly to valves of this type, which are operated by fluid pressure. Such valves are used for example in the hydraulic systems of air-craft and very often, the same pressurized fluid which is controlled by the valve is used to operate it, such operation being usually referred to as pilot valve operation. While the invention will be described in connection with a pilot valve for air-craft systems, it will be realized that usefulness of the invention is not limited to such valves, but may be incorporated in many other types of hydraulic systems.

It is a major object of the present invention to provide in a unitary structure, a fluid pressure powered main valve and an electric actuator for a pilot valve, controlling the main valve operations.

It is another object of the invention to provide a structure of the class described which avoids the use of packing glands around any movable parts thus making the unit long wearing and adaptable for use with relatively high fluid pressures.

Still another object of the invention is to provide a valve structure of the class described which is extremely compact, thus making it particularly useful in aircraft hydraulic systems.

A further object of the invention is the provision of a unit of the class described having a solenoid actuated pilot valve assembly, which is readily and easily removed for replacement and servicing purposes.

A still further object of the invention is to provide a four way electrically actuated valve of the class described in which either of two solenoid-pilot valve assemblies can be removed for servicing or replacement without disturbing the other assembly, and without disturbing the main valve assembly.

An additional object of the invention is to provide a valve structure of the class described in which the controlled, pressurized fluid is directly employed as the power source for operating the main valve and wherein no separate fluid connections to the valve operating means are required.

The foregoing and additional objects and advantages of the invention will appear in the following description of a presently preferred embodiment thereof, consideration being given also to the accompanying drawings, in which:

Figure 3 is an end elevational view of the valve shown in Figures 1 and 2, partially sectioned on the line 3—3 in Figure 1;

Figure 4 is an exploded view of one of the pilot valve assemblies of the valve shown in Figure 1;

Figure 5 is a schematic flow diagram illustrating the operation of the valve shown in the preceding figures;

Figure 6 is an end elevational view of a modified form of valve embodying the invention wherein pilot valve assemblies are arranged coaxially with a main valve;

Figure 7 is a front elevational view of the valve of Figure 6 partially sectioned on the line 7—7 therein; and Figure 8 is an oblique fragmentary section taken on the line 8—8 in Figure 6.

Figure 1:
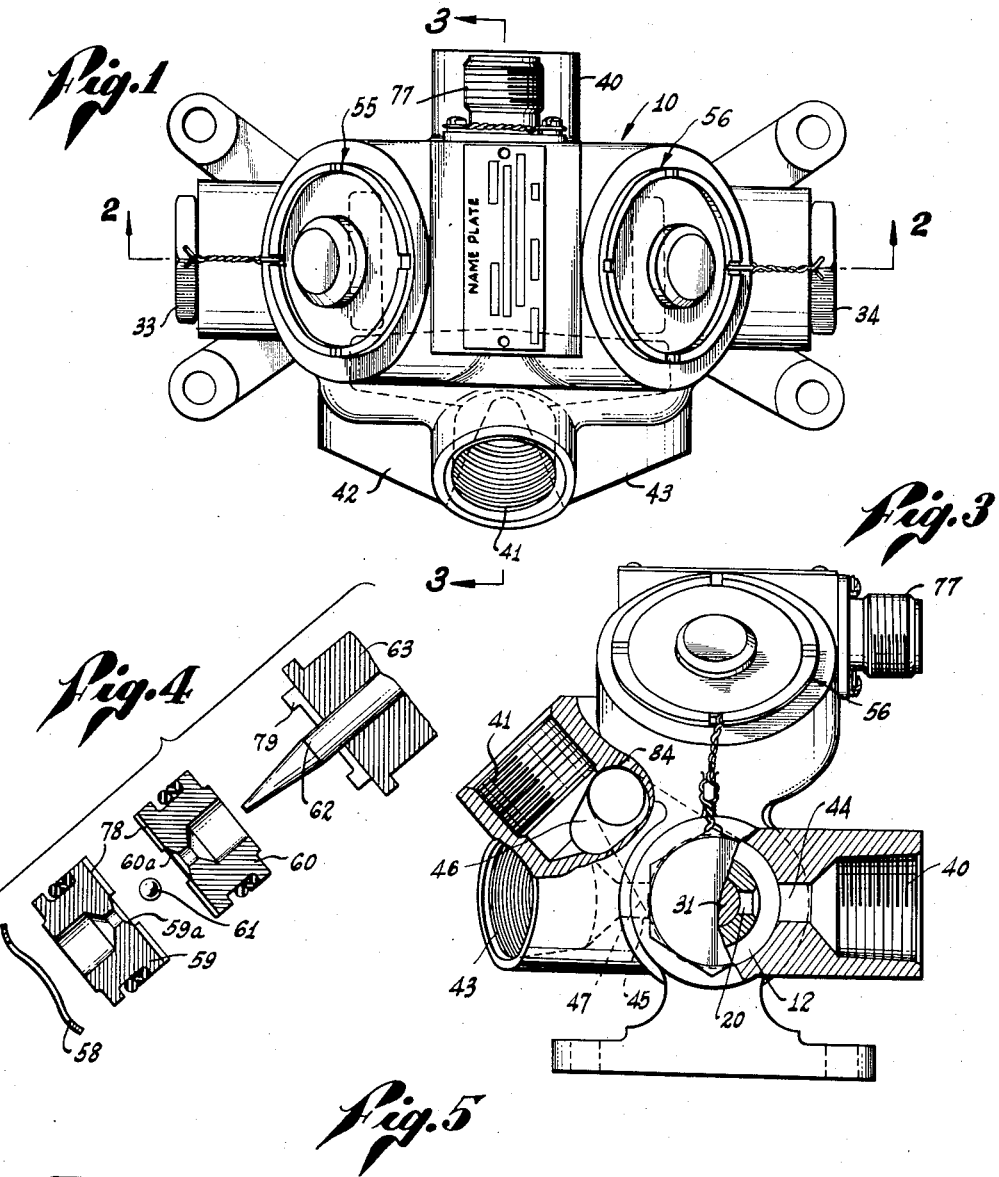
Figure 1 is a plan view of a presently preferred fourway, fluid-powered, solenoid-actuated hydraulic valve embodying the present invention.
Figure 2:
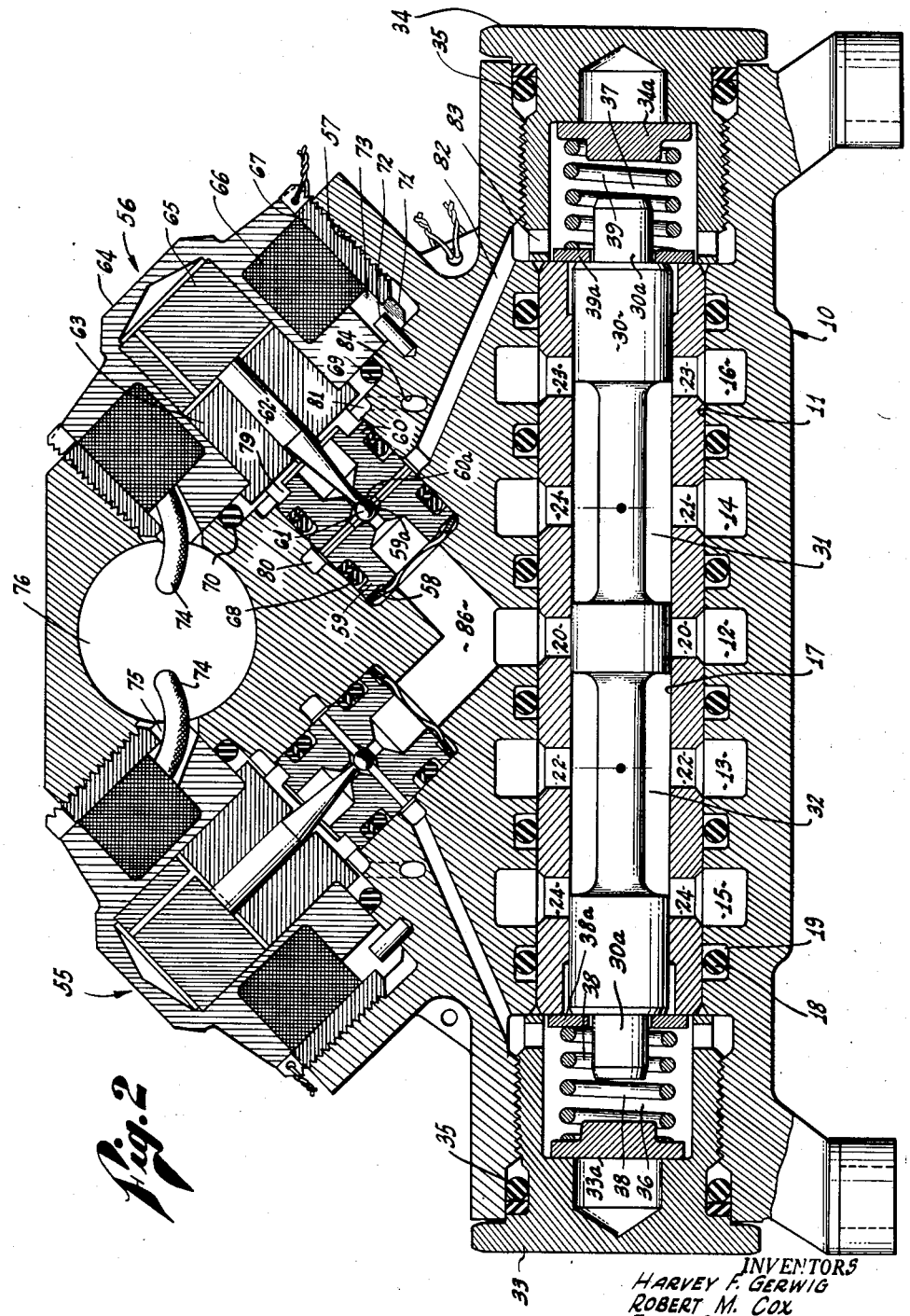
Figure 2 is a front elevational section taken on the line 2—2 in Figure 1.

Briefly, the presently preferred form of valve shown in Figures 1 through 5 and constituting one illustrative embodiment of the invention, comprises a four-way spool valve having an expansible chamber valve operating motor at each end of the spool. The expansible chamber of each motor is communicable selectively with the main pressure connection, or the return connection of the main valve, such selective communication being under the control of two separate solenoid pilot valves. When neither of the solenoids is energized, pressure is applied to both of the motor chambers, thus balancing out the motor forces and the spool is held in a central position by two centering springs. As will be described in more detail hereinafter, energization of either of the solenoids operates the pilot valve in a manner to unbalance the motor forces and moves the spool to one or the other of two desired positins.

For a more detailed description of the presently preferred form of the invention, reference should now be had to the drawings, wherein the reference character 10 designates a valve body which should be preferably a permanent mold casting of aluminum, or the like, having certain cored and drilled passageways to be described.

The body 10 is formed with a longitudinal bore 11 in which is formed, by either coring or machining, a plurality of annular undercut chambers 12, 13, 14, 15 and 16. A liner sleeve of a wear resistant material, such as hardened steel is installed into the bore 11 whereby to separate each of the undercuts into a distinct annular chamber, the latter being sealed off from each other and from the ends of the bore by O-rings 18 positioned in internal grooves 19 formed in the bore 11. A plurality of radial openings 20, 21, 22, 23, and 24 arranged in circumferential groups and perforating the wall of the sleeve 17 communicates each of the undercut chambers 12 through 16 respectively, with the interior of the sleeve 17.

Longitudinally slidable within the sleeve 17 is a valve spool 30 of relatively wear resistant material having a substantially fluid tight sliding fit in the bore of the sleeve. The spool 30 is formed with external annular grooves 31 and 32 which are positioned and adapted to inter-communicate certain selected groups of openings 20 through 24 when the spool is shifted longitudinally as will be described.

The ends of the bore 11 are closed with threaded plugs 33 and 34 and sealed with O rings 35. The plugs 33 and 34 are internally recessed to form spring receiving and pressure chambers 36 and 37. Two centering springs 38 and 39 are anchored against the plugs 33 and 34 within the chambers 36 and 37 and are arranged to press through intervening washers 38a and 39a against the opposite ends of the spool 30. The washers 38a and 39a are held coaxial with the spool by studs 30a projecting from the ends of the spool, the washers being somewhat larger than the external diameter of the spool so as to seat against the ends of the sleeve 17 when the spool is centered as shown in Figure 1. The studs 30a also serve to limit the operational movement of the spool 30 by impinging against buttons 33a and 34a located in the chambers 36 and 37 respectively.

When the spool 30 is shifted longitudinally by an unbalance in the fluid pressures in the respective chambers 36 and 37, one or the other of the washers 38a or 39a is lifted from its seat against the sleeve 17, compressing the associated springs 38 or 39, as the case may be. The springs 38 and 39 are under some initial compression even when the spool is centered whereby to hold the spool in its central position in spite of acceleration or gravitational forces that may act on the valves.

The external fluid connections to the valve body 10 may be seen best in Figure 1, a pressure connection 40 projecting rearwardly from the back of the body, a return connection 41 projecting forwardly and upwardly, and two cylinder connections 42 and 43 projecting divergently in a horizontal plane forward and below the return connection 41. The pressure connection 40 is internally communicated by a drilled passage 44 with the central undercut chamber 12, as can be seen in Figure 3. The cylinder connections 42 and 43 are similarly communicated with the intermediate undercut chambers 13 and 14 by drilled passageways 45 (see Figure 3) and the return connection 41 is communicated by cored passages 46 and 47 with the outer undercut chambers 15 and 16.

Other fluid passageways are to be described, but as thus far explained, the main functions of the valve may be understood. It will be seen that movement of the spool 30 to the left, for example, places the spool groove 31 in a position to underlie and embrace the openings 20 and 21 thus admitting pressurized fluid to the right hand cylinder connection 43. Such movement of the spool also places the spool groove 32 in a position to underlie and embrace the openings 22 and 24 thus returning fluid from the left hand cylinder connection 42 to the return connection 41. Conversely, movement of the spool 30 to the right reverses the above described connections and admits pressurized fluid to the left hand cylinder connection 42 and permits the return of fluid from the right hand cylinder connection 43. The operations just described are illustrated diagrammatically in Figure 5, wherein the valve is shown connected to a conventional double acting power cylinder 50.

Pilot operation of the spool 30 is achieved as follows. Two solenoid actuated, three-way pilot valves designated generally at 55 and 56 are mounted in the upper portion of the valve body 10 and communicated with the undercut pressure and return chambers and the power chambers, as will be described. Since the principal valve here described is bilaterally symmetrical, a detailed description of one of the pilot valve assemblies e. g. that designated at 56, will suffice for both.

The right hand pilot valve assembly 56 is mounted in an oblique bore 57 and includes; a spring washer 58, located at the bottom of the bore, two axially bored valve seats 59 and 60 with a valve ball 61 therebetween, an actuating rod 62, a solenoid core 63, a solenoid spool 64, an armature 65, a solenoid coil 66 wound on the spool 64, and a threaded retainer bushing 67. All of the foregoing listed parts are stacked one on top of the other in the bore 57 where they are retained by the threaded bushing 67.

The valve seats 59 and 60 are sealed with respect to the wall of the bore 57 by O rings 68 and the entire assembly is sealed to the exterior by an O ring 69 positioned between the inner face of the solenoid spool 64 and a shoulder 70 in the bore 57. The seats 59 and 60 are counterbored at 59a and 60a to form a valve chamber between the seats.

To retain the stacked parts in place, the retainer bushing 67 is arranged so that the inner end thereof thrusts against a flange 71 formed on the inner edge of the solenoid spool 64, and the parts are all held in tight face-to-face contact by the compressive forces of the spring washer 58 in the bottom of the bore 57 and also by the inlet fluid pressure in the annular chamber 12. A pin 72 pressed into the shoulder 70 engages a radial slot 73 in the flange 71 whereby to prevent rotation of the solenoid spool when the retainer bushing 67 is screwed home.

Electrical leads 74 from the coil 66 are brought out through a similar slot 75 in the flange 71 and into an opening 76 in the body 10. The leads are connected to a three terminal connector plug 77 mounted on the back of the body 10.

The abutting faces of the valve seats 59 and 60 are castellated or formed with crossed slots 78 as are the abutting faces of the valve seats 60 and the solenoid core 63, as indicated at 79. The slots 78 and 79 permit free lateral flow of fluid from the valve chamber between the seats 59 and 60 to the outer periphery of the bore 57.

The bore 57 is formed with an annular undercut recess 80 adjacent the interface between the valve seats 59 and 60 and a second similar recess 81 adjacent the interface between the valve seat 60 and the core 63. The recess 80 collects fluid passing outwardly between the valve seats and is communicated by an obliquely drilled passageway 82 and a lateral opening 83 in the plug 34, with the right hand power chamber 37. The recess 81 performs a similar function and is communicated by an obliquely drilled passageway 84 and a cored passage 46 with the return fluid connection 41.

The bore 57 has an inner reduced diameter extension 86 communicating the bottom end with the central or pressure undercut chamber 12

A modified form of pilot-operated valve embodying the invention is illustrated in Figures 6, 7, and 8. In the modified form, the pilot valve assemblies are arranged on the axis of the main valve and for that reason the modified form is sometimes referred to herein as the "in-line" version.

Inasmuch as the in-line version of the valve and the preferred embodiment illustrated in Figures 1 through 5 are virtually identical in function and quite similar in structure and components, the reference characters used to designate the parts of the in-line version are, respectively, each one hundred greater than the reference character indicating the corresponding part in the preferred embodiment. Thus, the body of the in-line form is designated with a reference character 110 corresponding to the body 10 in the preferred embodiment etc.

The construction and operation of the main spool valve in the in-line version of the valve is substantially identical to that of the first described embodiment. As can be seen in Figure 7, a pressure connection 140, cylinder connections 142 and 143, and a return connection 141 are formed as simple bores terminating in a flat surface 110a, whereby the device is adapted to be secured against a complemental flat surface (not shown) such as a boss formed on an actuating cylinder whereby to communicate the valve passages directly with the device to be operated.

In the in-line form of the valve, the pilot valve assemblies instead of being installed in separate oblique bores in the body, are inserted in terminal extensions of the main bore 111 such terminal portion of the bore extending beyond the actuating chamber 137 being designated by the reference character 157 and the in-line pilot valve assemblies themselves being designated by the reference character 156. The assembly 156 includes a pair of valve seat members 159 and 160, a solenoid core 163, a solenoid armature 165 having an operating rod 162 projecting therefrom, a valve ball 161, and a solenoid spool 164 carrying a solenoid coil 166 and retained in place by a threaded retainer bushing 167.

The inner valve seat member 159 has a central port 186d communicated by a diametral bore 186c with an annular undercut 186b in the bore portion 157 which in turn is communicated by an obliquely drilled passageway 186a with a longitudinal cored passageway 186 in the body 110 which communicates with the central pressure undercut 112 as in the earlier embodiment.

The outer valve seat member 160 differs somewhat from the other embodiment in that in this case it is sealingly received in a bore 159a formed in the inner valve seat member 159. As in the previous case, however, the proportions and arrangement of the valve seats 159 and 160 is such as to leave a fluid chamber therebetween having a valving ball 161 positioned therein and adapted to move selectively against one or the other of the seats in the members 159 and 160.

The valve port in the valve seat member 160 is communicated through a transverse slot 179 in the face of the solenoid core 163 to an annular counterbore 181 in the bore portion 157 and thence through an oblique passageway 184 and a longitudinal cored opening 146 and annular under-cut chamber 116 to the return fluid connection 141.

Thus it will be seen that when the valve ball 161 is against the seat in the outer valve seat 160, pressure fluid is admitted through the valve port 186d to the chamber 137 whereas when the ball 161 is against the valve seat in the member 159 the contents of the chamber 137 may discharge through the passageways 178 and the port in the outer valve seat 160. A more detailed description of this operation follows.

The details and arrangement of the pilot valve assemblies, having been described, the operation thereof is now explained with reference to the preferred form shown in Figures 1 through 5, it being understood that reference to the pilot valve parts of the assembly shown at 56 includes where appropriate a reference to the corresponding part in the opposite pilot valve assembly shown at 55. Similarly it should be understood that reference to the pilot assembly 56 includes corresponding reference to the "in-line" assembly 156.

With both of the solenoid coils 66 de-energized, the fluid pressure in the passageway 86 acting through the valve ball 61 and the actuating rod 62, moves the solenoid armature 65 to its outermost limiting position in which it is separated from the core 63. This in turn permits an outward movement of the valve ball 61 against the valve seat 60 to the return passageway 84. The valve ball 61 being off the seat 59, the main fluid pressure in the passageway 86 is, as previous described, effective in both the actuating chambers 37 and 36. Thus when both solenoids are de-energized and main fluid pressure exists in both the chambers 36 and 37, the fluid pressure forces acting on the spool 30 are balanced out and the two springs 38 and 39 hold the spool 30 in a centralized position established by the seating of the washers 38a and 39a against the opposite ends of the sleeve 17. Assuming now, that the solenoid coil 66 of the right hand pilot assembly 56 is energized, the armature 65 is drawn down against the core 63, causing the actuating rod 62 to force the valve ball 61 off the seat 60, and down against the inner valve seat 59 whereby to block off pressure fluid from the passageway 86. At the same time, the inward movement of the ball 61 permits the fluid in the right hand pressure chamber 37 to escape through the passageways 83—82, the now open valve seat 60, the recess 81, and the passageways 84 and 46 to the return connection 41. This releases the fluid pressure forces acting on the right end of the valve spool 30, permitting the fluid pressure in the left hand chamber 36 to exert a plunger force on the spool 30 forcing the same to the right, intercommunicating the various groups of apertures 20 through 24, as previously described.

Conversely, energization of the solenoid coil 66 in the left hand assembly 55 releases fluid from the left hand chamber 36 whereby to cause a leftward movement of the spool 30 in accordance with the mode of operation previously described.

The valve operation just described is rapid and positive and yet the moving parts involved are very simple to manufacture, and are easily installed. It will be seen that at the time of initial assembly or when the pilot assemblies 55 and 56 are replaced, no separate sub-assembly operations are required, the parts merely being inserted one after the other into the respective bores and locked home by a single threaded part 67. Furthermore, the pilot assemblies may be removed independently without disturbing the arrangement or adjustment of any other parts of the valve. Complete fluid tight sealing of each pilot assembly is accomplished by the single O ring 69, the solenoid spool 64 serving the dual function of receiving the coil 66 and forming a fluid tight cap for the assembly.

While the form of the invention shown and described herein is fully capable of achieving the objects and providing the advantages hereinbefore stated, it will be realized that still further variations and modifications are possible without departure from the spirit of the invention. For this reason, we do not mean to be limited to the form shown and described, but rather to the scope of the appended claims.

We claim:

1. A three-way valve comprising: means forming a bore in a valve body having an internal shoulder adjacent one end thereof and having three fluid connections, one adjacent each end, and one intermediate said end; a pair of annular valve seats having central ports, said seats being coaxially positioned in said bore and in sealing contact with the wall of said bore, one seat being located on each side of said intermediate fluid connection, said valve seats being formed to define a valve chamber therebetween and at least one of said seats having lateral fluid passage means formed therein to permit flow of fluid from said valve chamber to said intermediate fluid connection; a valve member in said chamber movable from one seat to the other selectively to block one or the other of said ports; actuating means in said valve body including an actuating member extending into said chamber to move said valve members aforesaid; and a closure member secured in the end of said bore opposite said shoulder, hermetically closing said bore and said actuating means and urging said seats in tight face-to-face contact and against said shoulder whereby accurately to position said seats in said bore.

2. A three-way valve comprising: means forming a bore reduced in diameter at one end to form an internal shoulder in said bore, means forming two lateral fluid passages communicating with said bore, a first at a point adjacent an end opposite said reduced end and the other at a point intermediate said ends; a compression spring in said bore seated against said shoulder; a first annular valve seat having a central port and coaxially positioned in said bore, seated against said spring, and in sealing contact with said bore; a second annular valve seat having a central port and coaxially positioned in said bore, abutting the other seat, and in sealing contact with said bore, said seats being formed to define a valve chamber between their adjoining faces and said adjoining faces being located substantially at said intermediate point, at least one said seat being recessed in the face abutting the other seat to form a valve chamber between said seats and at least one of said seats being radially grooved in in said abutting face to communicate said chamber with said passage at said intermediate point; a closure secured in said opposite end of said bore to close the same, said closure being engaged with said second seat to urge the same against said first seat and to urge said first seat against said spring to compress the same and hold said seats in tight face-to-face contact, the interface between said closure and second seat being radially grooved to communicate the port in said second seat with said first lateral passage; a valve member in said chamber movable between said seats selectively to block one or the other of said ports, and an actuating rod extending loosely through one of said ports to urge said valve member from one seat to the other as aforesaid.

3. The construction of claim 2 further characterized in that said closure is formed as the spool of a solenoid having a coil thereon, and an armature therein movable axially of said bore when said solenoid is energized and said actuating rod being an extension of said armature.

4. A fluid valve structure comprising: a body having a pressure fluid inlet and a return fluid outlet formed therein; a main valve in said body positioned and adapted to control flow from said inlet to said outlet; the opposite ends of the fluid valve each having the following structure: fluid motor means in said body connected to said main valve to operate the same; a pilot valve receiving bore portion in said body, means communicating a first end of said bore with said motor, means communicating the other end of said bore with said outlet, and means communicating a point intermediate said ends with said inlet; pilot valve means sealed in said bore and including a pair of opposed seat members each having a valve port with a seat at the mouth thereof, said seats being in opposed spaced relationship, one of said ports being communicated with said intermediate point and the other with said outlet; passage means in one of said seat members communicating the space between said seats with said first end of said bore; and means including a valve member movable from one seat to the other selectively to communicate said inlet or outlet with said motor.

5. In a valve of the type having a pressure fluid connection, a member movable to control the flow of fluid through said connection, and a fluid motor to move said member, a pilot valve assembly for said motor comprising: means forming a bore communicated at a point adjacent a first end with said pressure fluid connection, at a point intermediate its ends with said motor, and at a point adjacent the opposite end with a fluid exhaust; a pair of annular valve seats having central ports, said seats being coaxially positioned in face-to-face contact in said bore in sealing contact with the wall thereof and located on opposite sides of said intermediate point of communication, at least one of said valve seats being counterbored in the adjoining face thereof adjoining the other seat to define a valve chamber between said seats, and at least one of said seats having lateral fluid passage means formed therein to permit the flow of fluid from said valve chamber to said intermediate point of connection; a valve member in said chamber movable from one seat to the other selectively to block one or the other of said ports; and a solenoid in said bore adjacent an end thereof, said solenoid having an armature with an actuating member formed thereon extending through one of said ports into said valve chamber to actuate said last-named valving member as aforesaid when said solenoid is energized, said solenoid further including a spool having a front face positioned and adapted to hermetically close the exhaust end of said bore outwardly of said exhaust communication point.

6. A three-way valve comprising: means forming a bore, means forming two lateral fluid passages communicating with said bore, a first at a point adjacent one end of said bore and the other at a point intermediate the ends of said bore; stop means at one end of said bore, a first annular valve seat having a central port and coaxially positioned in said bore, contiguous to said stop means and in sealing contact with said bore; a second annular valve seat having a cetnral port and coaxially positioned in said bore, adapted to abut the other seat, and in sealing contact with said bore, said seats being formed to define a valve chamber between their adjoining faces and said adjoining faces being located substantially at said intermediate point, at least one of said seats being recessed in the face abutting the other seat to form a valve chamber between said seats; a closure secured in said opposite end of said bore to close the same, said closure being engaged with said second seat to urge the same against said first seat and to urge said first seat toward said stop means to compress the same and hold said seats in close engagement, the interface between said closure and said second seat being radially grooved to communicate the port in said second seat with said first lateral passage; a valve member in said chamber movable between said seats selectively to block one or the other of said ports, and an actuating rod extending loosely through one of said ports to urge said valve member from one seat to the other as aforesaid.

References Cited in the file of this patent

UNITED STATES PATENTS

| | | |
|---|---|---|
| 1,946,348 | Bath | Feb. 6, 1934 |
| 2,340,817 | Hurst | Feb. 1, 1944 |
| 2,363,111 | Bennett | Nov. 21, 1944 |
| 2,409,517 | Schmit | Oct. 15, 1946 |
| 2,537,391 | Bakewell | Jan. 9, 1951 |
| 2,591,800 | Gardiner | Apr. 8, 1952 |
| 2,601,990 | Holzer | July 1, 1952 |
| 2,641,229 | Bellows | June 9, 1953 |
| 2,700,986 | Gunn | Feb. 1, 1955 |
| 2,732,860 | Ray | Jan. 31, 1956 |